US008718969B2

(12) United States Patent
Li et al.

(10) Patent No.: US 8,718,969 B2
(45) Date of Patent: May 6, 2014

(54) APPARATUS AND METHOD FOR CONTINUOUS THERMAL MONITORING OF CURE STATUS OF GLASS FIBER PRODUCTS

(75) Inventors: Wei Li, New Albany, OH (US); David Rodenbaugh, Baltimore, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 226 days.

(21) Appl. No.: 13/116,611

(22) Filed: May 26, 2011

(65) Prior Publication Data

US 2012/0271588 A1    Oct. 25, 2012

Related U.S. Application Data

(63) Continuation-in-part of application No. 13/089,457, filed on Apr. 19, 2011.

(51) Int. Cl.
*G01K 7/02* (2006.01)
*G06F 15/00* (2006.01)
*G01K 1/02* (2006.01)

(52) U.S. Cl.
CPC . *G01K 7/02* (2013.01); *G01K 1/026* (2013.01)
USPC .............................. 702/130; 228/9; 524/494

(58) Field of Classification Search
CPC .......... G01K 7/02; G01K 1/026; C03B 37/01; C03C 25/00; C03C 25/12; C03C 25/285; G05D 23/1919; G05B 13/026; F26B 21/06; F26B 13/101
USPC ........ 702/99, 130, 131, 132, 135, 136; 228/9; 348/88; 524/494; 700/103, 122
See application file for complete search history.

(56) References Cited

U.S. PATENT DOCUMENTS

| 3,524,983 A | 8/1970 | Voelz |
| 3,539,316 A | 11/1970 | Trethewey |
| 4,203,155 A | 5/1980 | Garst |
| 4,363,968 A | 12/1982 | McGowan et al. |
| 4,554,437 A | 11/1985 | Wagner et al. |
| 4,582,520 A | 4/1986 | Sturm |
| 4,609,628 A | 9/1986 | Aschenbeck |
| 4,769,544 A | 9/1988 | Dahlquist |

(Continued)

FOREIGN PATENT DOCUMENTS

| WO | 2012/078743 | 6/2012 |
| WO | 2012/145498 | 10/2012 |
| WO | 2012/145500 | 10/2012 |

OTHER PUBLICATIONS

International Search Report and Written Opinion from PCT/US11/063720 dated Apr. 2, 2012.

(Continued)

*Primary Examiner* — John H Le
(74) *Attorney, Agent, or Firm* — Calfee, Halter & Griswold LLP

(57) ABSTRACT

A method and apparatus for assessing the cure status of a fibrous blanket manufactured with mineral fibers and binder is disclosed and comprises using continuous thermal measurement as an assessment of cure status. A plurality of thermocouples are installed in various oven locations both above and below the path of the fibrous pack to be cured and readings from the thermocouples are compared by a processor. The thermal measurements may be inlet or outlet temperatures of any particular zone or series of zones; or entry or egress temperatures; or averages or differences of measurements from selected thermocouple locations.

26 Claims, 5 Drawing Sheets

(56) References Cited

U.S. PATENT DOCUMENTS

| | | | |
|---|---|---|---|
| 5,142,151 | A | 8/1992 | Varnell et al. |
| 5,206,918 | A | 4/1993 | Levene |
| 5,457,319 | A | 10/1995 | Moe et al. |
| 5,556,578 | A | 9/1996 | Berneburg et al. |
| 5,932,665 | A | 8/1999 | DePorter et al. |
| 6,099,162 | A | 8/2000 | Walsh et al |
| 6,168,064 | B1 | 1/2001 | Berkin |
| 6,331,350 | B1 | 12/2001 | Taylor et al. |
| 6,699,945 | B1 | 3/2004 | Chen et al. |
| 6,867,421 | B1 | 3/2005 | Hunt et al. |
| 6,884,849 | B2 | 4/2005 | Chen et al. |
| 7,063,983 | B2 | 6/2006 | Chen |
| 7,435,444 | B2 | 10/2008 | Freeman et al. |
| 7,435,600 | B2 | 10/2008 | Packard |
| 7,520,188 | B2 | 4/2009 | Calicott et al. |
| 7,642,306 | B2 | 1/2010 | Charbonneau et al. |
| 7,718,214 | B2 | 5/2010 | Charbonneau |
| 7,781,512 | B2 | 8/2010 | Charbonneau et al. |
| 2001/0006264 | A1 | 7/2001 | Wit et al. |
| 2002/0022422 | A1 | 2/2002 | Waldrop et al. |
| 2002/0027074 | A1 | 3/2002 | Tominaga et al. |
| 2002/0146657 | A1 | 10/2002 | Anderson et al. |
| 2003/0103199 | A1 | 6/2003 | Jung et al. |
| 2003/0108662 | A1 | 6/2003 | Rodenbaugh et al. |
| 2003/0224527 | A1 | 12/2003 | Chen |
| 2005/0287675 | A1 | 12/2005 | Packard |
| 2006/0005580 | A1 | 1/2006 | Espiard et al. |
| 2006/0009569 | A1 | 1/2006 | Charbonneau et al. |
| 2006/0019024 | A1 | 1/2006 | Freeman et al. |
| 2007/0287018 | A1 | 12/2007 | Tutin et al. |
| 2008/0156041 | A1 | 7/2008 | Cooper |
| 2009/0007644 | A1 | 1/2009 | Freeman et al. |
| 2010/0001422 | A1 | 1/2010 | Kulprathipanja et al. |
| 2010/0068103 | A1 | 3/2010 | Charbonneau |
| 2011/0086567 | A1 | 4/2011 | Hawkins et al. |
| 2012/0144868 | A1 | 6/2012 | Mirth et al. |
| 2012/0144870 | A1 | 6/2012 | Johnson et al. |
| 2012/0145035 | A1 | 6/2012 | Shallenberger |
| 2012/0146252 | A1 | 6/2012 | Hawkins et al. |
| 2012/0268586 | A1 | 10/2012 | Yousef |
| 2012/0271445 | A1 | 10/2012 | Li |
| 2013/0152637 | A1 | 6/2013 | Mirth et al. |
| 2013/0152638 | A1 | 6/2013 | Johnson et al. |

OTHER PUBLICATIONS

International Search Report and Written Opinion from PCT/US12/34234 dated Sep. 21, 2012.

Zheng (Ed.) Model Predictive Controll, Sciyo, 2010 (downloadable at: http://www.intechopen.com/books/show/title/model-predictive-control).

Badgwell & Qin, Industrial Model Predictive Control—An Updated Overview, presentation Mar. 9, 2002 (cited at: http://www.nt.ntnu.no/users/skoge/presentation/mpc_badgwell/mpc_survey_handout.pdf.

International Search Report and Written Opinion, Application No. PCT/US12/34230 filed Apr. 19, 2012, Dated Jul. 17, 2012.

Office action from U.S. Appl. No. 13/313,072 dated Aug. 2, 2013.

Kam et al., "Optimal parameters for curing graphite/epoxy composite laminates", J. of materials Processing Technology, vol. 48, pp. 357-363 (1995).

Office action from U.S. Appl. No. 13/089,457 dated Sep. 26, 2013.

Office action from U.S. Appl. No. 13/089,457 dated Feb. 13, 2014.

Office action from U.S. Appl. No. 13/313,071 dated Feb. 20, 2014.

APPARATUS AND METHOD FOR CONTINUOUS THERMAL MONITORING OF CURE STATUS OF GLASS FIBER PRODUCTS

CROSS-REFERENCE TO RELATED APPLICATIONS

This application is continuation-in-part of co-owned U.S. patent application Ser. No. 13/089,457 filed Apr. 19, 2011 which is incorporated by reference.

BACKGROUND

This invention relates in general to insulation products made from fibrous minerals like glass and, in particular, to quality control methods for determining the cure status, i.e. whether the product is undercured, overcured or properly cured within specifications and process control limits.

Fibrous glass insulation products generally comprise randomly-oriented glass fibers bonded together by a cured thermosetting polymeric material. Molten streams of glass are drawn into fibers of random lengths and blown into a forming chamber or hood where they are randomly deposited as a pack onto a porous, moving conveyor or chain. The fibers, while in transit in the forming chamber and while still hot from the drawing operation, are sprayed with an aqueous dispersion or solution of binder. The residual heat from the glass fibers and combustion gases, along with air flow during the forming operation, are sufficient to vaporize and remove much of the sprayed water, thereby concentrating the binder dispersion and depositing binder on the fibers as a viscous liquid with high solids content. Ventilating blowers create negative pressure below the conveyor and draw air, as well as any particulate matter not bound in the pack, through the conveyor and eventually exhaust it to the atmosphere. The uncured fibrous pack is transferred to a drying and curing oven where a gas, heated air for example, is blown through the pack to dry the pack and cure the binder to rigidly bond the glass fibers together in a random, three-dimensional structure, usually referred to as a "blanket." Sufficient binder is applied and cured so that the fibrous pack can be compressed for packaging, storage and shipping, yet regains its thickness—a process known as "loft recovery"—when compression is removed.

While manufacturers strive for rigid process controls, the degree of binder cure throughout the pack may not always be uniform for a variety of reasons. Irregularities in the moisture of the uncured pack, non-uniform cross-machine weight distribution of glass, irregularities in the flow or convection of drying gasses in the curing oven, uneven thermal conductance from adjacent equipment like the conveyor, and non-uniform applications of binder, among other reasons, may all contribute to areas of over- or under-cured binder. Thus it is desirable to test for these areas in final product to assure quality.

U.S. Pat. No. 3,539,316 to Trethewey and U.S. Pat. No. 4,203,155 to Garst both describe curing ovens in which a thermocouple is installed inside the curing oven and is used to provide feedback to the heater control to make adjustments if the sensed temperature is not at a predetermined setpoint. While useful, this approach has drawbacks in that the thermocouple senses the generalized oven air temperature and gives no information about the pack temperature where the binder is located, and therefore no information about cure status.

U.S. Pat. No. 7,781,512 to Charbonneau, et al, describes two mechanisms for monitoring the cure status of formaldehyde-free glass fiber products. In the first embodiment, one or more spectrographic sensors, such as an infrared sensor, detect the radiant energy from the pack upon exit from the oven. In a second embodiment, thermocouples are placed directly into the pack prior to entering the oven, and the signals are led by wires to an external device or to a transportable storage device such as a M.O.L.E® recorder (although the term "oven mole" is often used generically). Upon exit, data collected in the storage device is uploaded and in all cases, the measured temperatures are compared to standard values to determine cure.

These methods also have drawbacks. While a "mole" provides a good estimate of the actual pack temperature, it has several disadvantages. First, it measures the temperature at only one location of the pack, testing only a sampling of the product. Second, it must be inserted prior to the oven and removed after the oven, and this involves a labor intensive manual process. Third, it does not provide real-time data; the storage device is removed and evaluated, but this is long after the pack has emerged so the data cannot effectively be used as a means to adjust any process parameters. Finally, it provides data only for as long as the pack is in the oven. In other words, the data it provides is not continuous. On the other hand, infrared measurements may be continuous, but are less useful as process controls when measures after exit from the oven.

The present invention seeks to overcome these disadvantages.

SUMMARY OF THE INVENTION

The invention relates generally to methods for assessing the cure status of a fibrous blanket manufactured with mineral fibers and binder. In a first important aspect, the invention comprises an apparatus for monitoring the cure status of binder in a fibrous product comprising:

a curing oven having at least two zones with blowers for circulating heated gas through the oven zones, and a conveyor defining a fibrous product path for carrying a fibrous product through the oven zones;

at least two thermocouples for generating a signal corresponding to the temperature of the gas circulating in the oven zones, wherein at least one thermocouple is an outlet thermocouple in a first oven zone and at least one other thermocouple is selected from an outlet thermocouple or an inlet thermocouple in either of the at least two oven zones; and a processor for receiving the signals from the thermocouples and generating a binder cure status based on the signals from the at least two thermocouples.

In most embodiments, at least one oven zone has two or more thermocouples. The thermocouples may both be outlet thermocouples, they may both be inlet thermocouples, or they may be one of each type. If they are both the same type (inlet or outlet), the processor may include circuitry for averaging the signals from the two thermocouples, and/or it may have circuitry for calculating a difference between the two thermocouples. If the two thermocouples are of different types (inlet or outlet), the processor may include circuitry for calculating a difference between the two thermocouples, and/or for averaging the signals from the two thermocouples. In some embodiments, the at least two thermocouples include at least one outlet thermocouple and one inlet thermocouple, and wherein the processor includes comparator circuitry for comparing the signal from the outlet thermocouple to the signal from the inlet thermocouple to determine a temperature differential. There may, of curse be more than just two thermocouples per zone or subzone.

When there are two or more thermocouples, one may be located near a zone entry and another thermocouple may be located near a zone egress. Of course, middle or intermediate locations are possible as well. In these embodiments, the processor may include circuitry for calculating a difference between the two thermocouples, and/or for averaging the signals from the two thermocouples. In one particular embodiment having adjacent subzoens of similar type (drying or curing) there is at least one outlet thermocouple in the first oven subzone positioned near the entry of the oven zone, and at least one outlet thermocouple in the subsequent, adjacent oven subzone positioned near the egress of the subzone. Preferably, the processor includes comparator circuitry for comparing the signal from the outlet thermocouple of the first oven subzone to the signal from the outlet thermocouple of the subsequent oven subzone to determine a temperature differential.

In most embodiments, each of the thermocouples is located in close proximity to the fibrous product path. This may be within 24, 18, 12, 9, 6, or 3 inches from the fibrous pack or the path it takes through the oven; and is close enough to differentiate the temperature of the fibrous pack from the temperature of the essentially homogeneous mixture gas (air) within the portion of the oven zone above or below the pack path.

In a second important aspect, the invention comprises a method for monitoring the cure status of binder in a fibrous product as the fibrous product passes through an oven, the method comprising:

measuring a first outlet temperature in at least one first zone of a curing oven having at least two zones, each zone having a blower for circulating heated gas through the zone and a conveyor for carrying a fibrous product through the oven zones, the fibrous product having a thermosetting binder to be cured;

measuring a second inlet or outlet temperature in either of the at least two zones of the oven;

comparing the first outlet temperature to at least one of a second inlet temperature, a second outlet temperature or a standard temperature to generate a comparative differential temperature; and determining binder cure status based on the comparative differential temperature.

The methods may be practiced with any of the variations and embodiments of the apparatus as described herein. The comparing step of the method may include comparing the signals from the at least two thermocouples to determine a temperature differential and this is the case regardless of the thermocouple locations, e.g. both inlet, both outlet, one inlet and one outlet, both entry, both egress, one entry and one egress, etc. The method may further comprise averaging the signals from two thermocouples, again regardless of location, although this is particularly useful as a redundancy and accuracy tool when the two averaged thermocouples are in essentially the same location.

Various aspects of this invention will become apparent to those skilled in the art from the following detailed description of the preferred embodiment, when read in light of the accompanying drawings.

Figure 1:
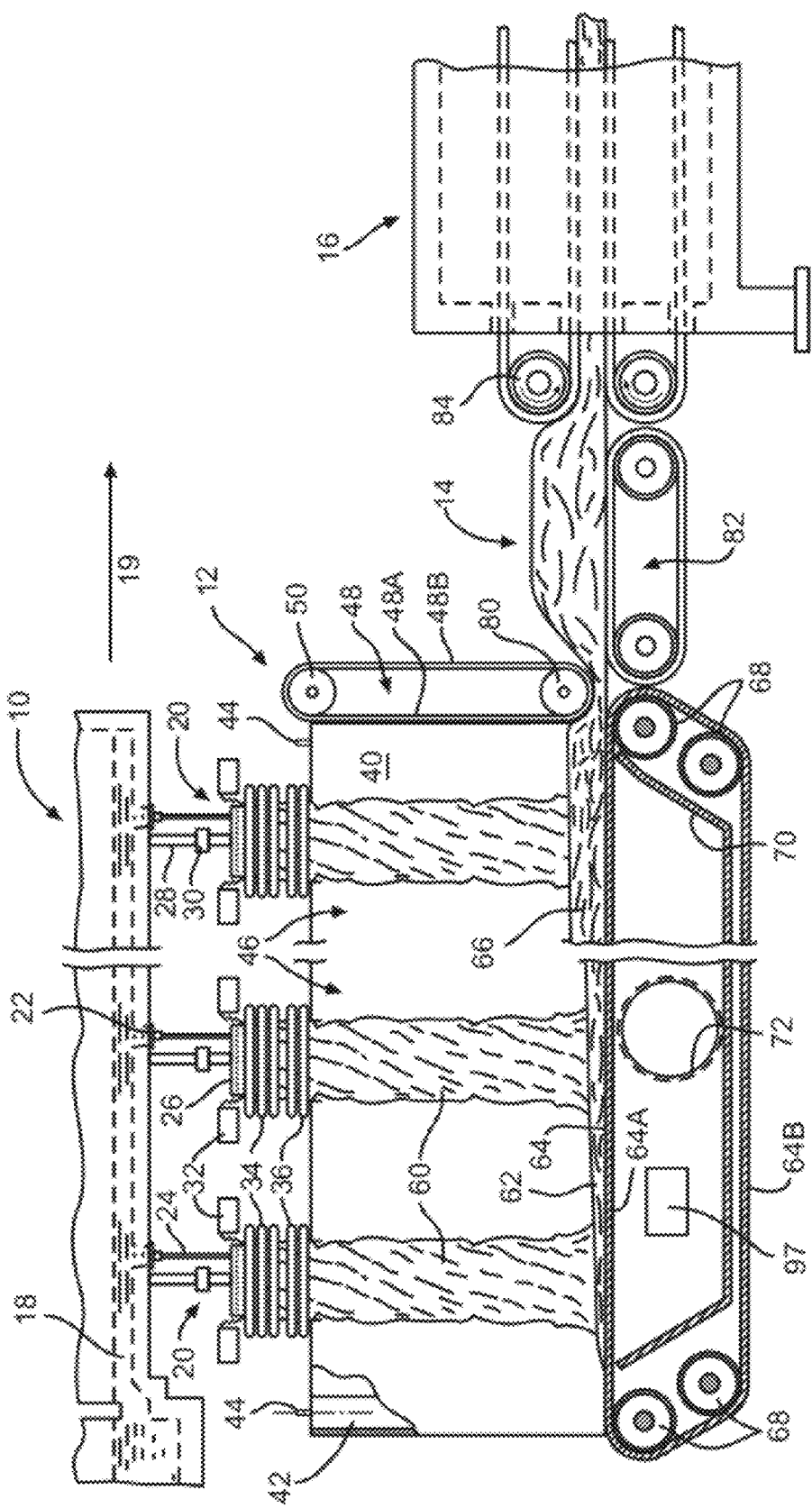
FIG. 1 is a partially sectioned side elevation view of a forming hood component of a manufacturing line for manufacturing fibrous products.

The patent or application file contains one or more drawings executed in color and/or one or more photographs. Copies of this patent or patent application publication with color drawing(s) and/or photograph(s) will be provided by the Patent Office upon request and payment of the necessary fee.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity.

Unless otherwise indicated, all numbers expressing ranges of magnitudes, such as angular degrees or sheet speeds, quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. All numerical ranges are understood to include all possible incremental sub-ranges within the outer boundaries of the range. Thus, a range of 30 to 90 degrees discloses, for example, 35 to 50 degrees, 45 to 85 degrees, and 40 to 80 degrees, etc.

"Binders" are well known in the industry to refer to thermosetting organic agents or chemicals, often polymeric resins, used to adhere glass fibers to one another in a three-dimensional structure that is compressible and yet regains its loft when compression is removed. "Binder delivery" refers to the mass or quantity of "binder chemical" e.g. "binder solids" delivered to the glass fibers. This is typically measured in the industry by loss on ignition or "LOI," which is a measure of the organic material that will burn off the fibrous mineral. A fibrous pack is weighed, then subjected to extreme heat to burn off the organic binder chemical, and then reweighed. The weight difference divided by the initial weight (×100) is the % LOI.

As solids, rate of binder delivery is properly considered in mass/time units, e.g. grams/minute. However, binder is typically delivered as an aqueous dispersion of the binder chemical, which may or may not be soluble in water. "Binder dispersions" thus refer to mixtures of binder chemicals in a medium or vehicle and, as a practical matter, delivery of binder "dispersions" is given in flow rate of volume/time. e.g. liters/minute or LPM of the dispersion. The two delivery expressions are correlated by the mass of binder per unit volume, i.e. the concentration of the binder dispersion. Thus, a binder dispersion having X grams of binder chemical per liter flowing at a delivery rate of Z liters per min delivers X*Z grams/minute of binder chemical. Dispersions include true solutions, as well as colloids, emulsions or suspensions.

References to "acidic binder" or "low pH binder" mean a binder having a dissociation constant (Ka) such that in an aqueous dispersion the pH is less than 7, generally less than about 6, and more typically less than about 4.

Fibrous products are products made from a plurality of randomly oriented fibers. The fibers are generally bound in place by binders, described above. "Mineral fibers" refers to any mineral material that can be melted to form molten mineral that can be drawn or attenuated into fibers. Glass is the most commonly used mineral fiber for fibrous insulation purposes and the ensuing description will refer primarily to glass fibers, but other useful mineral fibers include rock, slag and basalt. Polymer fibers are fibers of any thermoplastic materials, for example as polyvinyls or polyesters like polyethylene, polypropylene and their terephalate derivatives.

"Product properties" refers to a battery of testable physical properties that insulation batts possess. These may include at least the following common properties:

"Recovery"—which is the ability of the batt or blanket to resume it's original or designed thickness following release from compression during packaging or storage. It may be tested by measuring the post-compression height of a product of known or intended nominal thickness, or by other suitable means.

"Stiffness" or "sag"—which refers to the ability of a batt or blanket to remain rigid and hold its linear shape. It is measured by draping a fixed length section over a fulcrum and measuring the angular extent of bending deflection, or sag. Lower values indicate a stiffer and more desirable product property. Other means may be used.

"Tensile Strength"—which refers to the force that is required to tear the fibrous product in two. It is typically measured in both the machine direction (MD) and in the cross machine direction ("CD" or "XMD").

"Lateral weight distribution" (LWD or "cross weight")—which is the relative uniformity or homogeneity of the product throughout its width. It may also be thought of as the uniformity of density of the product, and may be measured by sectioning the product longitudinally into bands of equal width (and size) and weighing the band, by a nuclear density gauge, or by other suitable means.

"Vertical weight distribution" (VWD)—which is the relative uniformity or homogeneity of the product throughout its thickness. It may also be thought of as the uniformity of density of the product, and may be measured by sectioning the product horizontally into layers of equal thickness (and size) and weighing the layers, by a nuclear density gauge, or by other suitable means.

Of course, other product properties may also be used in the evaluation of final product, but the above product properties are ones found important to consumers of insulation products.

General Fiberizing Process

FIG. 1 illustrates a glass fiber insulation product manufacturing line including a forehearth 10, forming hood component or section 12, a ramp conveyor section 14 and a curing oven 16. Molten glass from a furnace (not shown) is led through a flow path or channel 18 to a plurality of fiberizing stations or units 20 that are arranged serially in a machine direction, as indicated by arrow 19 in FIG. 1. At each fiberizing station, holes 22 in the flow channel 18 allow a stream of molten glass 24 to flow into a spinner 26, which may optionally be heated by a burner (not shown). Fiberizing spinners 26 are rotated about a shaft 28 by motor 30 at high speeds such that the molten glass is forced to pass through tiny holes in the circumferential sidewall of the spinners 26 to form primary fibers. Blowers 32 direct a gas stream, typically air, in a substantially downward direction to impinge the fibers, turning them downward and attenuating them into secondary fibers that form a veil 60 that is forced downwardly. The fibers are distributed in a cross-machine direction by mechanical or pneumatic "lappers" (not shown), eventually forming a fibrous layer 62 on a porous conveyor 64. The layer 62 gains mass (and typically thickness) with the deposition of additional fiber from the serial fiberizing units, thus becoming a fibrous "pack" 66 as it travels in a machine direction 19 through the forming area 46.

One or more cooling rings 34 spray coolant liquid, such as water, on veil 60 to cool the fibers within the veil. Other coolant sprayer configurations are possible, of course, but rings have the advantage of delivering coolant liquid to fibers throughout the veil 60 from a multitude of directions and angles. A binder dispensing system includes binder sprayers 36 to spray binder onto the fibers of the veil 60. Illustrative coolant spray rings and binder spray rings are disclosed in US Patent Publication 2008-0156041 A1, to Cooper. Each fiberizing unit 20 thus comprises a spinner 26, a blower 32, one or more cooling liquid sprayers 34, and one or more binder sprayers 36. FIG. 1 depicts three such fiberizing units 20, but any number may be used. For insulation products, typically from two to about 15 units may be used in one forming hood component for one line.

The forming area 46 is further defined by side walls 40 and end walls 48 (one shown) to enclosed a forming hood. The side walls 40 and end walls 48 are each conveniently formed by a continuous belt that rotates about rollers 44 or 50, 80 respectively. The terms "forming hoodwall", "hoodwall" and "hood wall" may be used interchangeably herein. Inevitably, binder and fibers accumulate in localized clumps on the hoodwalls and, occasionally, these clumps may fall into the pack and cause anomalous dense areas or "wet spots" that are difficult to cure.

The conveyor chain 64 contains numerous small openings (encompassing e.g. approximately 50% of the area) allowing the air flow to pass through while links support the growing fibrous pack. A suction box 70 connected via duct 72 to fans or blowers (not shown) are additional production components located below the conveyor chain 64 to create a negative pressure and remove air injected into the forming area. As the conveyor chain 64 rotates around its rollers 68, the uncured pack 66 exits the forming section 12 under exit roller 80, where the absence of downwardly directed airflow and negative pressure (optionally aided by a pack lift fan, not shown) allows the pack to regain its natural, uncompressed height or thickness s. A subsequent supporting conveyor or "ramp" 82 leads the fibrous pack toward an oven 16 and between another set of porous compression conveyors 84 for shaping the pack to a desired thickness for curing in the oven 16.

Upon exit from the oven 16, the cured pack or "blanket" 67 is conveyed downstream for cutting and packaging steps. For many products, the blanket is sectioned or "split" longitudinally into multiple pieces or lanes of standard width dimension, for example, 14.5 inch widths and 22.5 inch are standardized to fit in the space between 2×4 studs placed on 16 inch or 24 inch centers, respectively. Other standard widths may also be used. A blanket may be 4 to 8 feet in width and produce multiple such standard width pieces.

Blankets are typically also sectioned or "chopped" in a direction transverse to the machine direction for packaging. Transverse chopping divides the blanket lanes into shorter segments known as "batts" that may be from about 4 feet up to about 12 feet in length; or into longer, rolled segments that may be from about 20 feet up to about 175 feet or more in length. These batts and rolls may eventually be bundled for packaging. A faster-running takeup conveyor separates one batt from another after they are chopped to create a space between sectioned batt ends. If longitudinal "lanes" are desired, they generally are split prior to chopping into shorter lengths.

Oven Zones and Thermocouples

Figure 2:
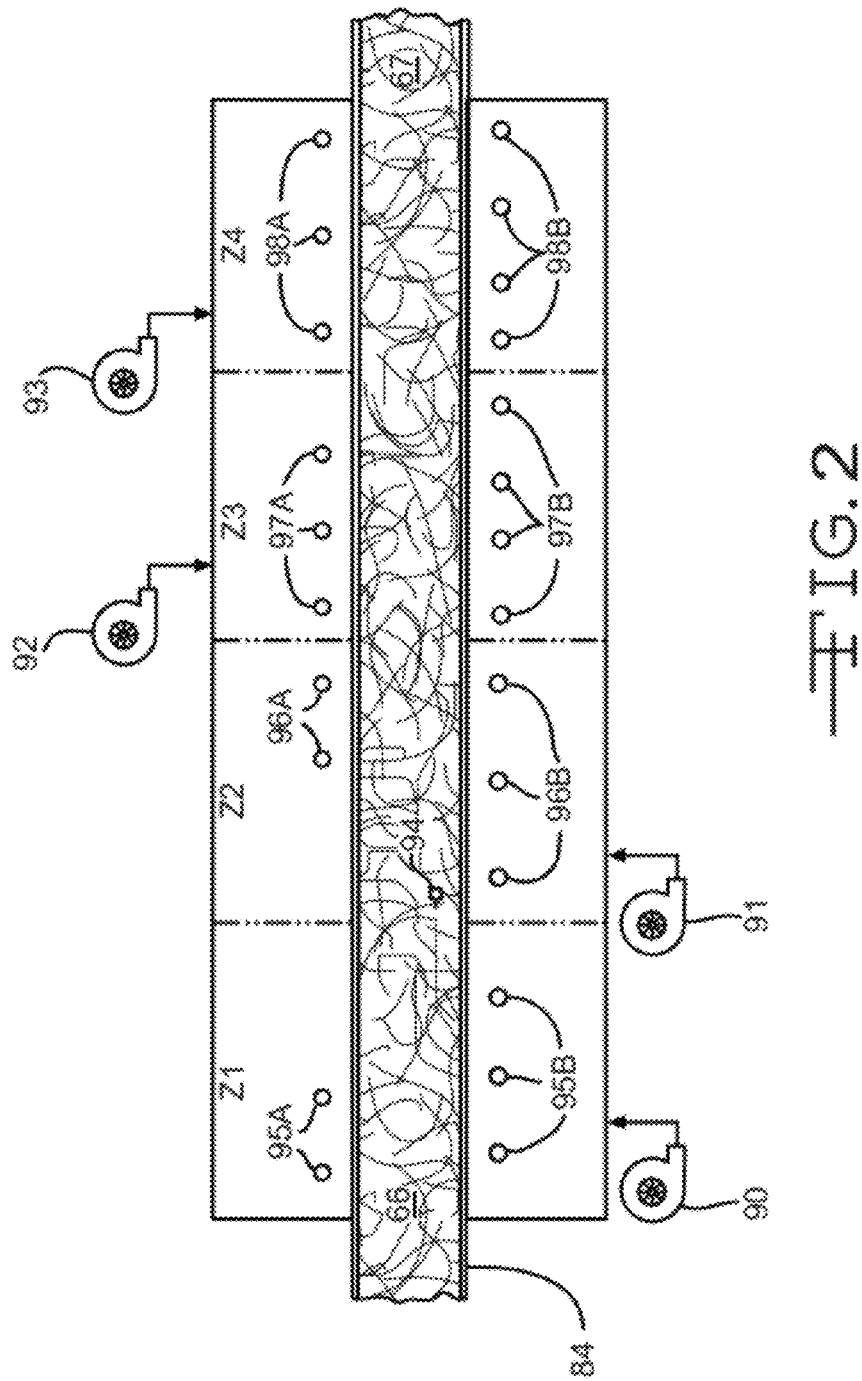
FIG. 2 is a schematic illustration representing the curing oven and its several zones and locations of thermocouples in the oven zones for one embodiment.
Figure 3:
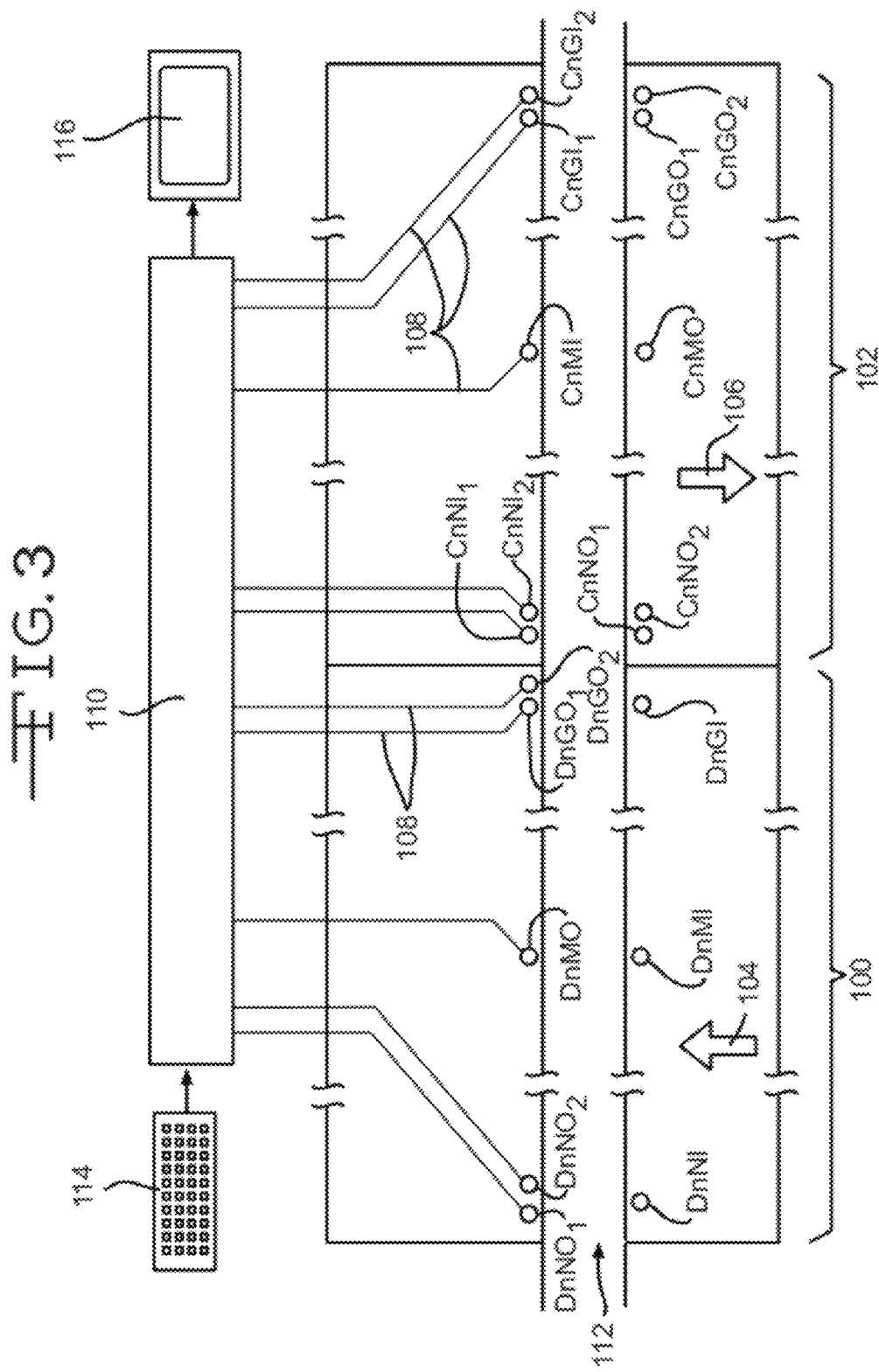
FIG. 3 is a schematic illustration representing two oven zones, a processor, and thermocouple locations and nomenclature for one embodiment.

The curing oven applies heated gas, typically air, and circulates it through the fibrous pack to dry and cure it. When fibrous products are formed with accompanying moisture, the moisture must be removed (i.e. the product must be dried) before it will reach the critical temperature necessary to cure binder. Conveniently, the oven may be divided into at least two zones, a drying zone and a curing zone, and each of these may be further subdivided into subzones. Each "zone" or "subzone" as used herein will have separate and distinct controls for temperature setpoints and blower or fan speeds. FIGS. 2 and 3 are schematic representations of ovens with zones and/or subzones.

FIG. 2 is a schematic diagram representing an oven 16 which typically may include four distinct (sub)zones, Z1, Z2, Z3 and Z4. The zones are designed to carry out multiple processes. In zones #1 and #2, fans 90, 91 blow a stream of warmed air upwards through the pack 66; while in zones #3 and #4, fans 92, 93 blow a stream of warmed air downwards through the pack 66. Zones #1 and #2 may be thought of as "drying" subzones, while zones #3 and #4 may be thought of as "curing" subzones. The choice of up-versus down draft is a matter of preference, but upward is often used first to help counteract the downward suction force present in the forming hood.

The air is heated by any suitable means, such as gas burners (not shown) associated with each zone to a temperature in the range of from about 400 F to about 600 F. In some embodiments, drying (sub)zones (e.g. zones #1 and #2) are generally heated to a temperature setpoint of about 400 F to about 450 F, while curing (sub)zones (e.g. zones #3 and #4) are generally heated to a temperature setpoint from about 430 F to about 550 F.

As mentioned, oven controls include controls (not shown) for increasing or decreasing the temperature and/or fan speed of each oven zone independently. In order to monitor the temperature of the oven, thermocouples may be installed to compare the actual oven temperature to the setpoint.

The present invention goes beyond this however, to provide an apparatus and method for continuously monitoring temperatures at various locations throughout the oven, and manipulating these measurements in various ways to obtain useful information about the pack temperature and cure state. While some of these are approximations of the pack temperature, good correlation has been found to exist with empirical data. Moreover, these measurements are delivered continuously in real time, so they can be used for process control. This latter point is a key advantage.

In order to cure thermosetting binder in a fibrous pack, the pack must reach a certain critical temperature to initiate and complete the chemical crosslinking curing reaction. While the specific critical temperature may vary depending on the nature of the binder, the thickness of the product and other factors, it is generally in the range of from about 200° F. to about 400° F. Energy is put into the pack in the form of heated gas, typically heated air. But so long as moisture exists in the pack, a great deal of the input energy is used up evaporating the water and drying the pack rather than raising its temperature toward the critical temperature. Pack temperature changes little during this drying phase. Once the pack is mostly dry—a point known as "drying time" or "drying distance"—additional energy input does begin to raise the pack temperature toward the critical temperature and the chemical binder begins to crosslink or "cure" in this curing phase. Applicants have found that, by placing multiple thermocouples in various locations in the oven zones, they can obtain useful temperature information from which the timing and status of the drying phase and curing phase can be estimated.

The location of the thermocouples in the ovens is important and some specific terminology is developed to describe the location. Initially, one may identify the zone in which the thermocouple is placed. There are at least two zones, e.g. a drying zone and a curing zone, designated (D) and (C) respectively. If they are divided into subzones, they may be designated by a numeral, e.g. D1, D2, D3 . . . Dn or C1, C2, C3 . . . Cn. Alternatively, when the distinction between a drying zone and a curing zone is not identifiable, multiple zones of subzones may be designated Z1, Z2, Z3 . . . Zn. The four subzones in FIG. 2 are thus labeled Z1, Z2, Z3 and Z4. However, in the description and claims, references to "first", "second", "one", and "another" oven zones or subzones serves only to differentiate one zone from any other zone and does not refer to any particular ordinal position and is explicitly not limited to specific zones #1 and #2. Descriptors like "previous", "prior", "adjacent", "later" or "subsequent" do refer to the relative order of zones, but not to any specific unit or position. When a specific oven zone is referenced, the Dn/Cn (or Zn) designation is used.

Within each oven zone, the conveyor 84—often in top and bottom portions—defines a path along which the fibrous pack is carried. The conveyor 84 is again a foraminous web and may be approximately 50% porous and have a thickness of about 0.2 to about 6 inches. The conveyor 84 and the fibrous pack path it defines enter each oven zone at an "entry" and leave each oven zone at an "egress." Thermocouples may be placed in each zone near the entry, near the egress, or at any intermediate or middle locations along the path between the entry and egress. These locations are given shorthand notations "N" for entry, "G" for egress, and "M" for middle positions. In some embodiments, the thermocouples are relatively linear in the machine direction and approximately along the cross-machine center line of the zone, although they might also be placed non-linearly or in arrays with cross-machine spacing between thermocouples. It should also be understood that in some zones the conveyor chain itself can carry significant heat from a previous zone, and this can compound the analysis of the temperature of the pack near the entries.

Furthermore, thermocouples may be placed above or on top of the conveyor path (T), below the path (B), or both above and below the path (T/B). While 'above' and 'below' have meaning in the context of gravity, the direction of airflow in any given zone is a more relevant consideration, so it is more useful to think of the thermocouples as being located upstream or downstream of the pack path, sensing an inlet (designated "I") or outlet (designated "O") temperature, respectively. For example in upflow zones, thermocouples below the pack sense an "inlet" temperature of the air "upstream" of the pack (i.e. before the air passes through the pack); and thermocouples above the pack sense an "outlet" temperature of the air "downstream" of the pack (i.e. after the passes through the pack). In downflow zones, the reverse is true, the thermocouples above the pack sense inlet temperature while the thermocouples below the pack sense outlet temperatures. In the context of the energy content of the air, upstream or inlet (I) thermocouples always sense higher energy inlet air temperatures, and downstream or outlet (O) thermocouples sense lower temperatures after the pack has absorbed the energy from the heated air.

Thus, the location of each thermocouple may be specified by a series of designator letters (or numbers) that indicated its location in the oven. For a linear array, three designators suffice, although a fourth may be useful for non linear arrays. Since redundant thermocouples may be used at any location for accuracy and safety, a subscript numeral may be added. Table A below indicates some of the possible location designators, although all potential permutations are possible.

TABLE A

Illustrative Location Designators

| Designator | Location description |
|---|---|
| D1NI | at the entry of the first drying zone and upstream of the path (inlet side) |
| D1NO$_1$, D1NO$_2$ | a pair of thermocouples both at the entry of a first drying zone and downstream of the path (outlet side) |
| D2GI$_1$, D2GI$_2$, D2GI$_3$ | a trio of thermocouples at the egress of a second drying zone and upstream of the path (inlet side) |
| Z2GO$_1$, Z2GO$_2$ | a pair of thermocouples both at the egress of a second (unspecified) zone and downstream of the path (outlet side) |
| C2NI | at the entry of a second curing zone and upstream of the path (inlet side) |
| D2MO$_1$, D2MO$_2$ | a pair of thermocouples at the middle of a second drying zone and downstream of the path (outlet side) |
| C2GO$_1$, C2GO$_2$ | a pair of thermocouples both at the egress of a second curing zone and downstream of the path (outlet side) |
| Z4GO$_1$, Z4GO$_2$, Z4GO$_3$, Z4GO$_4$ | a quartet of thermocouples both at the egress of a fourth (unspecified) zone and downstream of the path (outlet side) |
| Z3NI | at the entry of the third (unspecified) zone and upstream of the path (inlet side) |
| Z3MIT | at the middle of a third (unspecified) zone and upstream of the path (inlet side) which happens to be on top of the path indicating an downflow zone |
| D1NOT$_1$, D1NOT$_2$ | a pair of thermocouples both at the entry of a first drying zone and downstream of the path (outlet side) which happens to be on top of the path indicating an upflow zone |
| Z4GOB$_1$, Z4GOB$_2$ | a pair of thermocouples both at the egress of a fourth (unspecified) zone and downstream of the path (outlet side) which happens to be on bottom of the path indicating an downflow zone |

A final location consideration is how far the thermocouples are placed above or below the fibrous pack path itself. In general, thermocouples are placed in close proximity to the pack. "Close proximity" as used herein means within a distance that is close enough to differentiate the temperature of the fibrous pack from the temperature of the essentially homogeneous mixture gas (air) within the portion of the oven zone above or below the pack path. Typically this "close proximity" distance is less than about 24 inches, more likely less than about 18 inches or 12 inches, or even less than about 9, inches, 6 inches or 3 inches. The thickness of the conveyor itself plus a margin for mechanical safety will constrain how close a thermocouple can be to fibrous pack.

Thus, as shown in FIG. 2, thermocouples 95A-98A may be installed in the oven above the pack 66, and/or thermocouples 95B-98B may be installed below the pack 66. In each case the thermocouples are in close proximity to the pack 66 and its path along the conveyor 84. Although FIG. 2 represents 3 or 4 thermocouples above and below the pack 66 in each zone, the number may vary from 1 to about 15 in each zone, depending on the cross-sectional area and/or length of the zone.

By placing thermocouples in sets, some above (A) and some below (B) the pack, it is possible to understand how much energy is absorbed by the pack in evaporating the moisture from it or in carrying out the drying and curing reaction. This is advantageous over a mole thermocouple in that real-time pack temperature data is available on a continuous basis. In oven zones #1 and #2, which are depicted as upflow zones, the lower thermocouples 95B and 96B are "upstream" or "inlet" thermocouples since they monitor the inlet temperature of air as it enters the pack; while upper thermocouples 95A and 96A are "downstream" or "exit" thermocouples (in zones #1 and #2) since they monitor the temperature of air as it exits the pack. Conversely, because the flow is reversed in zones 3 and 4, lower thermocouples 97B and 98B can be thought of as "downstream" or "exit" thermocouples and upper thermocouples 97A and 98A can be thought of as "upstream" or "inlet" thermocouples. Furthermore, it can be observed that in zone #1, the outlet thermocouples 95A are near the entry of zone #1, while in zone #2, the outlet thermocouples are near the egress of zone #2.

The actual thermocouples used may be any of a wide variety designed to operate at the temperatures of the curing ovens. Suitable thermocouples include those made of alloys of metals, primarily nickel, copper, aluminum and chromium (some with minor amounts of silicon and/or manganese, for example chromel, alumel and constantan) having sensitivities varying from about 40 µV to about 60 µV per ° C. change. Thermocouples are generally graded with a letter indicating type. Types K and J have been found suitable, J having generally higher sensitivity.

Comparator Circuitry

FIG. 3 schematically illustrates an oven with two zones: a drying zone 1 (100) and curing zone 2 (102). Drying zone 1 is an upflow zone as shown by arrow 104; and curing zone 2 is a downflow zone as shown by arrow 106. A series of thermocouples are shown in each oven zone, each thermocouple being identified using the location designation nomenclature described above. Thermocouple conductor leads 108 connect the thermocouples to the processor unit 110. For clarity, the conductor leads 108 are shown only for thermocouples located above the path 112, it being understood that thermocouples below the path 112 are similarly connected to the processor 110. An input device 114, such as a keyboard, touchpad, touchscreen, mouse or the like, may optionally be provided to program or provide other information to the processor. An output device 116, such as a printer, display monitor, speaker or the like, may also be connected to the processor. The input device 114 and output device 116 are adapted to provide interfaces, for example, visual, audible, tactile or other interfaces.

Figure 4:
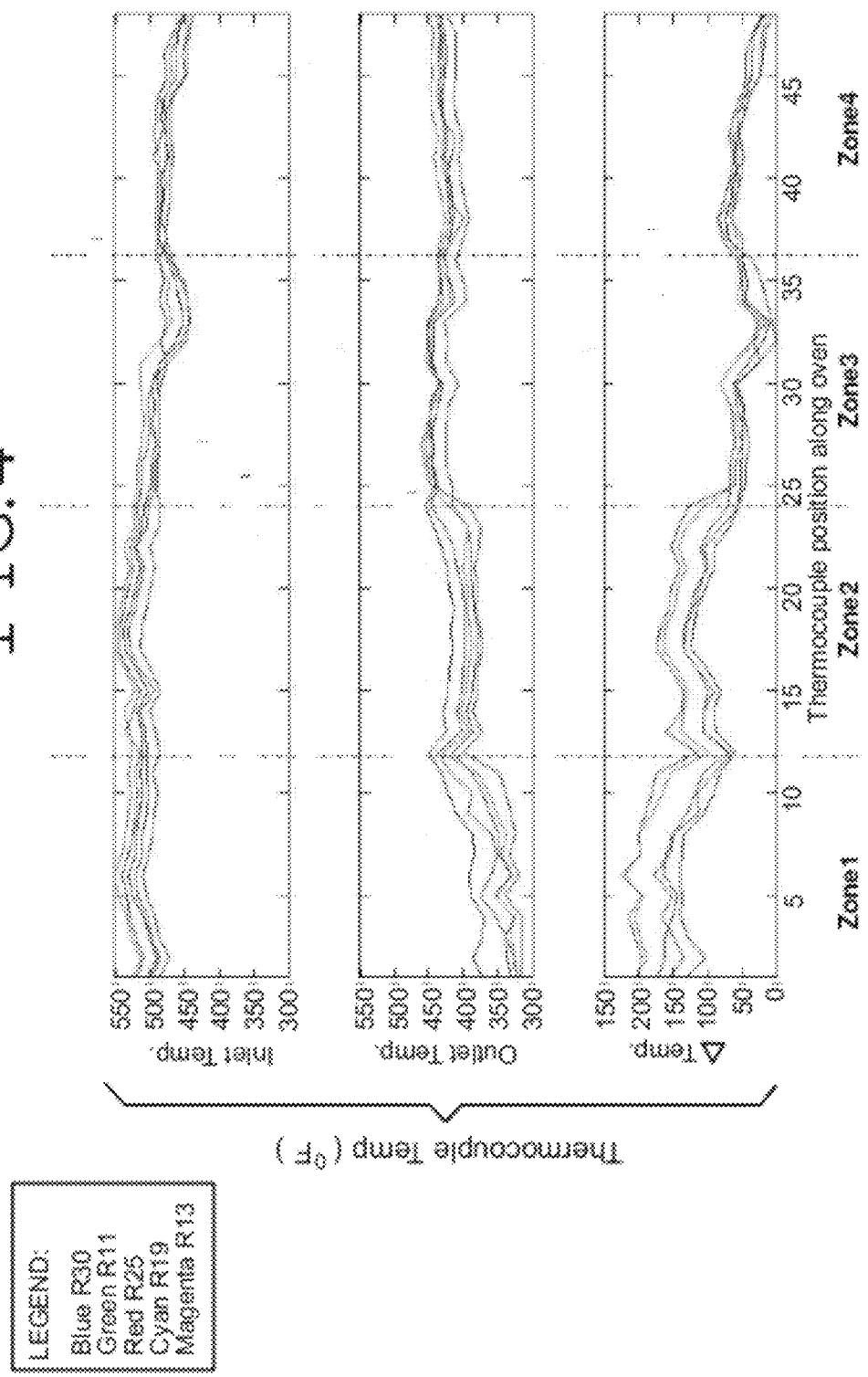
FIGS. 4 and 5 are color graphs of data described in more detail in the examples.
Figure 5:
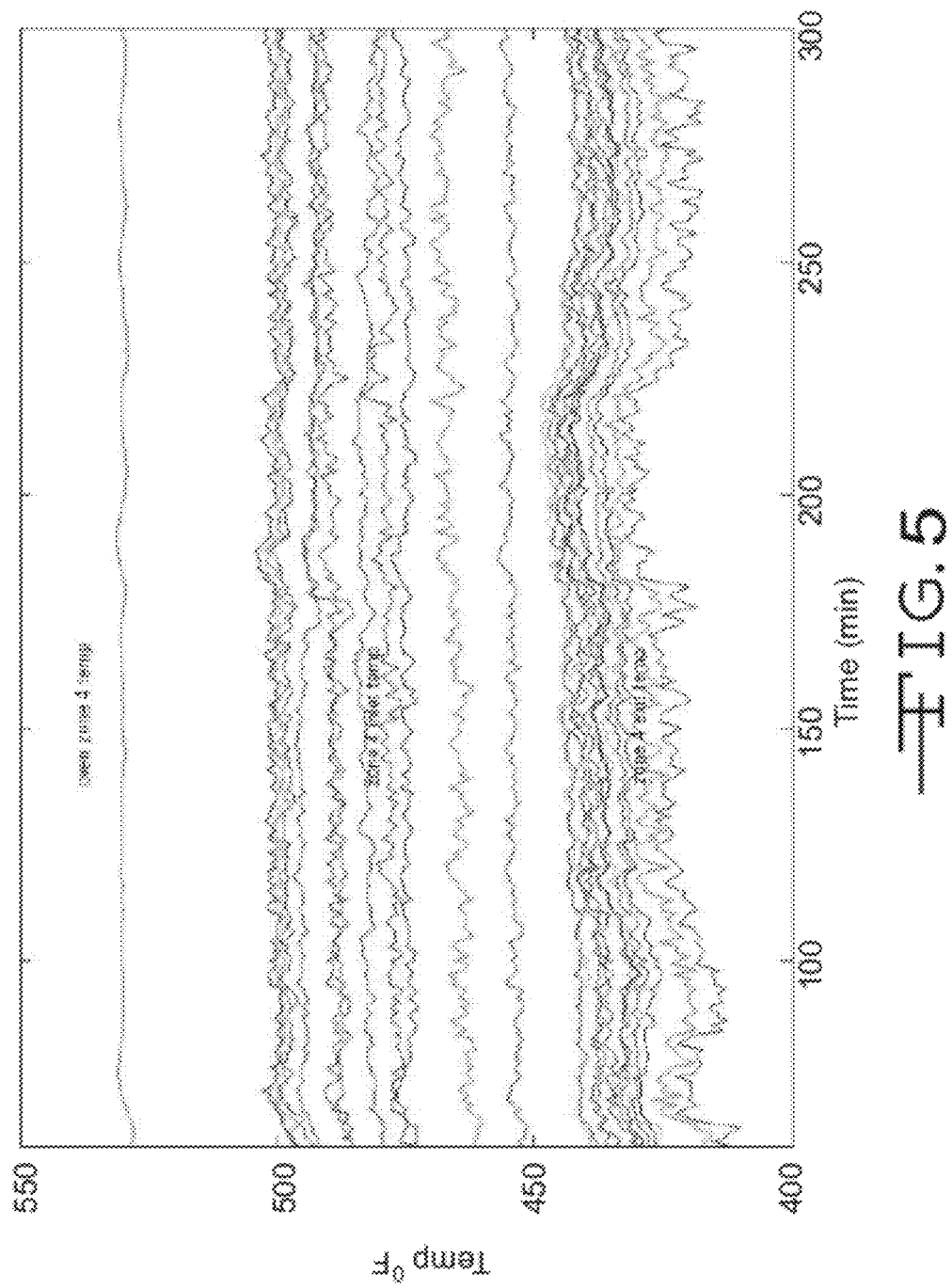

Processor circuitry and components suitable for comparing the thermocouple outputs are standard in the industry and need not be described in detail herein. In general, two types of comparisons are useful: averages and differences. However, the information gleaned from an average or difference will vary depending on the location of thermocouples whose outputs are compared. With reference to FIGS. 3-5, Table B describes some averaging comparisons and some difference comparisons that have proven useful.

TABLE B

Illustrative Thermocouple Comparisons

| Comparison | Interpretation/Explanation |
|---|---|
| Averages | |
| $DnNO_1$ and $DnNO_2$ or $DnGO_1$ and $DnGO_2$ or $CnGO_1$ and $CnGO_2$ | averaging two or more thermocouples in the same location provides redundancy safety and greater accuracy due to potential miscalibrations; this may also be useful in non-linear arrays having multiple temperature readings in a cross machine direction. |
| DnNO and DnGO and optionally with DnMO | averaging two or more thermocouples in different linear positions across the same zone or subzone provides information about the average pack temperature across the zone; this may be useful in comparison to the oven zone setpoint or as used in differences (see below) |
| Differences | |
| D1NI and D1NO or DnGI and DnGO or DnNI and DnGO | differences in temperature from upstream (inlet) side to downstream (outlet) side provide information about the moisture content in the drying zones or subzones; the more moisture, the greater the evaporation and the greater the temperature difference. This may be compared at any linear position or across the entire zone or subzone. It is especially useful at the first entry position, giving a measure of the initial pack moisture. |
| DnNO and DnGO or especially D1NO and D2GO | outlet differences from entry to egress in a drying zone or subzone suggest the extent of drying. Generally, outlet temperature rises gradually across a zone or subzone as more moisture is removed. This is also useful across multiple drying zones, or in multiple iterations as a temperature profile from a starting point |
| CnNI and CnGO | differences in temperature from upstream (inlet) side to downstream (outlet) side in the curing zone or subzone provide information about the extent of curing; generally this difference is fairly small compared to differences in the drying zones/subzones |
| CnNO and CnGO, C3NO and C4GO or D1NO to C4GO | outlet differences from entry to egress in a curing zone or subzone suggest the extent of curing. If there is a substantial difference here, it could indicate some drying is still taking place. Additionally, the entire differential profile throughout the oven, e.g. from D1 to Cn is useful for monitoring cure as it provides assurance of adequate pack cure temperature sustained for an adequate duration of time, (e.g. See Example 1 and FIG. 4). |
| CnGO and a standard temperature determined from empirical work | It has been found that if a particular temperature is achieved for a sufficient duration of time in a curing zone or subzone, the product will be well cured. This temperature depends on the particular manufacturing line and product (e.g. R-value, thickness, density, binder type and load, etc) but can be determined empirically. |

As noted in Table B above, applicants have found that difference between the outlet temperature in zone #1 near the entry and the outlet temperature in zone #2 near the egress (delta T) can be used to infer moisture drying rate in the pack. This is an important one of several possible comparator manipulations of temperature data. A second useful comparator is derived from the entry temperatures (inlet and outlet) in zone #1. For a given inlet entry temperature the resultant outlet entry temperature is suggestive of how much initial moisture is present in the pack to absorb energy; the greater this difference, the higher the moisture level. A third possible comparator is the difference between inlet and outlet thermocouple pairs throughout the drying phase or drying distance (typically zones #1 and #2) and also throughout the curing phase, (e.g. zones #3 and #4). Within each zone the paired thermocouple difference generally diminishes moving from entry to egress as moisture is evaporated. When this difference reaches a sufficiently small threshold value, one may conclude the pack is essentially dried and the remaining energy absorption is attributed to the chemical curing reaction. This is another inference of drying distance. Another useful value is the outlet temperature in the oven zone, which can be used to estimate the pack temperature once the pack is dry.

While each comparison described in Table B above is binary, compound comparisons are also encompassed. For example, taking the difference of two averaged readings, or combining the initial inlet-outlet difference with the entry-egress outlet differences in a complex comparison.

Methods of use of the present invention involve taking the thermocouple signals (or the temperatures they represent) during a manufacturing run and comparing them in various ways as described above to assess the cure status of the fibrous blanket.

Furthermore, the thermal information obtained from the oven thermocouples may be used alone or in combination with other measurements to assess cure. Some other possible measurements include pH, for example, as disclosed in co-owned provisional application 61/421,295 filed Dec. 9, 2010, and/or color as disclosed in application Ser. No. 13/089,457 filed Apr. 19, 2011, both of which are incorporated by reference.

Having generally described this invention, a further understanding can be obtained by reference to certain specific examples illustrated below which are provided for purposes of illustration only and are not intended to be all inclusive or limiting unless otherwise specified.

EXAMPLES

Example 1

Temperature Profiles

Trials were conducted in a plant by installing multiple thermocouples in each oven zone of a four zone curing oven. Various fiberglass insulation test products were produced, including insulation blankets having R-value designations R-11, R13, R-19, R-25 and R-30. The temperatures (° F.) sensed by the thermocouples were recorded to generate the temperature profiles shown in FIG. 4. A temperature difference was also calculated between the inlet and outlet temperatures at each thermocouple location and this is also shown in FIG. 4. In each case the data points represent the average of 60 minutes of readings for each position; and the x-axis represents the position of the thermocouples along the four zone oven path.

The profiles are instructive. The set temperature and fan speed conditions vary from one zone to the next, so transitions between zones can cause abrupt changes. But within the conditions of a particular zone, the temperature will begin to rise gradually once the moisture is evaporated, a point known as "drying time" or "drying distance". In FIG. 4, this can be observed near the end of zone #2 for each product. In addition, the inlet-outlet difference diminished greatly but does not quite disappear since energy is still being absorbed by the fibrous product to effect the cure reaction. By the end of zone #4, the inlet and outlet temperatures are nearly equal (i.e. the difference in nearly zero) so that the outlet temperature of zone #4 is a fair measure of the pack temperature. Provided the profile shows a sufficiently high exit temperature for a sufficient time period, cure status is confirmed.

It is observed that each product thickness (R-value) generates a distinct profile. While one might expect the profiles to be more ordered with greater inlet-outlet differences for the higher R-values (thicker and presumably containing more moisture) other production factors such as coolant or binder adjustments, or oven temp or fan speed, may confound such an expectation.

Example 2

Comparison of Thermocouples to Oven Mole

In a plant where thermocouples had been installed and where inlet and outlet temperatures were being measured for each oven zone. FIG. 5 shows the data recorded over time from individual inlet and outlet thermocouples in zone 4. The inlet temperature at each thermocouple fell between 450 and 500° F. The outlet or "exit" temperatures all fell between 420 and 440° F. An oven mole was inserted into the pack and transmitted through the oven during the times of these recordings for comparison purposes. Upon exit, it was learned that the mole recorded an average temperature of 439.3° F. while in zone 4 during its transit. This can be correlated fairly well with the outlet temperatures, which average about 430° F. and all fall within a range from about 420° F. to 440° F.

In addition, the relatively stable average temperature of about 430° F. indicates—based on empirical, historical evidence—that this particular product (Australian R-3.5 fiberglass insulation) is fully cured.

Example 3

Use of Continuous Thermal Measurements

With at least one thermal measurement of cure assessment in hand, the cure status of the pack or batt is known with a higher degree of accuracy, including information about the degree or magnitude of undercure or overcure, if any. This provides the manufacturer with valuable and actionable data with which to adjust the process controls as needed. For example, manufacturers have predetermined product specifications and product not falling within those ranges is said to be "out of spec" and must generally be scrapped or recycled. Moreover, most manufacturers have process controls and set predetermined limits to the variability of their processes. These parameters are summarized in the following Table C.

TABLE C

Manufacturing Limits

| Abbreviation | Term and meaning |
|---|---|
| USL | Upper Specification Limit—the value above which product is out of spec and must be discarded or scrapped. |
| UCL | Upper Control Limit—the value above which product is outside of the preset limits of acceptable process variability, although it may still be within spec. |
| LCL | Lower Control Limit—the value below which product is outside of the preset limits of acceptable process variability, although it may still be within spec. |
| LSL | Lower Specification Limit—the value below which product is out of spec and must be discarded or scrapped. |

Knowing the cure status quantitatively in relation to these limits has significant consequences for the manufacturer. As noted above, product that is "out of spec" is generally scrapped or recycled. But if the only information available to the manufacturer is that the product is undercured—then a manufacturer may scrap product unnecessarily if it was low but still above a LSL. More specifically, product testing outside the USL and LSL still must be scrapped, but product testing between the USL and UCL, or between the LCL and LSL may still be used and not scrapped. This is valuable information, since the manufacturer will incorrectly scrap good product less frequently.

Perhaps even more importantly, the manufacturer now gains quantitative information about how far the product is from any of the limits mentioned above. Previously, if product was within specification it was retained and the process was deemed acceptable and not necessarily adjusted. Product testing outside the Control Limits (i.e. >UCL or <LCL) but still within spec (i.e. >LSL and <USL) gives the manufacturer the opportunity to adjust process controls to try to bring the process back under tighter control. And knowing the test result quantitatively provides information about how much to adjust the process controls. In other words, the quantitative result provides information not only about the direction of a process change, but also about the magnitude of such a process change. None of this is possible with simple, qualitative testing procedures.

The principle and mode of operation of this invention have been explained and illustrated in its preferred embodiment. However, it must be understood that this invention may be practiced otherwise than as specifically explained and illustrated without departing from its spirit or scope.

What is claimed is:

1. Apparatus for monitoring a cure status of binder in a fibrous product comprising:
a curing oven having at least two zones with blowers for circulating heated gas through the oven zones, and a conveyor defining a fibrous product path for carrying the fibrous product through the oven zones;
at least two thermocouples for generating a signal corresponding to a temperature of the gas circulating in the oven zones, wherein at least one thermocouple is positioned above the fibrous product in a first oven zone and at least one other thermocouple is positioned below the fibrous product in either of the at least two oven zones; and
a processor that receives the signals from the thermocouples.

2. The apparatus of claim 1 wherein at least one oven zone has at least two thermocouples.

3. The apparatus of claim 2 wherein the at least two thermocouples are both either outlet thermocouples or inlet thermocouples, and wherein the processor includes circuitry for averaging the signals from the two thermocouples.

4. The apparatus of claim 2 wherein the at least two thermocouples include at least one outlet thermocouple and one inlet thermocouple, and wherein the processor includes circuitry for averaging the signals from the two thermocouples.

5. The apparatus of claim 2 wherein one of the at least two thermocouples is located near a zone entry and the other thermocouple is located near a zone egress, and wherein the processor includes circuitry for comparing the signals from the two thermocouples to determine a temperature differential.

6. The apparatus of claim 2 wherein the at least two thermocouples include at least one outlet thermocouple and one inlet thermocouple, and wherein the processor includes comparator circuitry for comparing the signal from the outlet thermocouple to the signal from the inlet thermocouple to determine a temperature differential.

7. The apparatus of claim 1 wherein each of the thermocouples is located in close proximity to the fibrous product path.

8. The apparatus of claim 7 wherein each of the thermocouples is located within about 12 inches from the fibrous product path.

9. The apparatus of claim 7 wherein each of the thermocouples is located within about 6 inches from the fibrous product path.

10. The apparatus of claim 1 wherein one zone is a drying zone and the other zone is a curing zone and at least one of the drying and curing zones is further divided into at least two subzones.

11. The apparatus of claim 10 wherein a first oven subzone has at least one outlet thermocouple and a subsequent adjacent oven subzone has at least one outlet thermocouple.

12. The apparatus of claim 11 wherein the outlet thermocouple in the first oven subzone is positioned near the entry of the oven zone, and the outlet thermocouple in the subsequent oven subzone is positioned near the egress of the subzone.

13. The apparatus of claim 12 wherein the processor includes comparator circuitry for comparing the signal from the outlet thermocouple of the first oven subzone to the signal from the outlet thermocouple of the subsequent oven subzone to determine a temperature differential.

14. The apparatus of claim 1 wherein the at least two thermocouples are outlet thermocouples positioned within their oven zone at a location selected independently from (a) near the entry of the oven zone, (b) near the egress of the oven zone, (c) near the middle of the oven zone, or (d) at the transition from one oven zone to the next.

15. Apparatus for monitoring a cure status of binder in a fibrous product comprising:
a curing oven having at least two zones with blowers for circulating heated gas through the oven zones, wherein air is blown upward through the fibrous product in at least one zone and air is blown downward through the fibrous product in at least one other zone, and a conveyor defining a fibrous product path for carrying the fibrous product through the oven zones;
at least two thermocouples for generating a signal corresponding to a temperature of the gas circulating in the oven zones, wherein at least one thermocouple is in the oven zone where air is blown upward through the fibrous product and at least one other thermocouple is in the oven zone where air is blown downward through the fibrous product; and
a processor that receives the signals from the thermocouples.

16. The apparatus of claim 15 wherein at least one oven zone has at least two thermocouples.

17. The apparatus of claim 16 wherein the at least two thermocouples are both either outlet thermocouples or inlet thermocouples, and wherein the processor includes circuitry for averaging the signals from the two thermocouples.

18. The apparatus of claim 16 wherein the at least two thermocouples include at least one outlet thermocouple and one inlet thermocouple, and wherein the processor includes circuitry for averaging the signals from the two thermocouples.

19. The apparatus of claim 16 wherein one of the at least two thermocouples is located near a zone entry and the other thermocouple is located near a zone egress, and wherein the processor includes circuitry for comparing the signals from the two thermocouples to determine a temperature differential.

20. The apparatus of claim 16 wherein the at least two thermocouples include at least one outlet thermocouple and one inlet thermocouple, and wherein the processor includes comparator circuitry for comparing the signal from the outlet thermocouple to the signal from the inlet thermocouple to determine a temperature differential.

21. The apparatus of claim 15 wherein each of the thermocouples is located in close proximity to the fibrous product path.

22. The apparatus of claim 15 wherein one zone is a drying zone and the other zone is a curing zone and at least one of the drying and curing zones is further divided into at least two subzones.

23. The apparatus of claim 22 wherein a first oven subzone has at least one outlet thermocouple and a subsequent adjacent oven subzone has at least one outlet thermocouple.

24. The apparatus of claim 23 wherein the outlet thermocouple in the first oven subzone is positioned near the entry of the oven zone, and the outlet thermocouple in the subsequent oven subzone is positioned near the egress of the subzone.

25. The apparatus of claim 24 wherein the processor includes comparator circuitry for comparing the signal from the outlet thermocouple of the first oven subzone to the signal from the outlet thermocouple of the subsequent oven subzone to determine a temperature differential.

26. The apparatus of claim 15 wherein the at least two thermocouples are outlet thermocouples positioned within their oven zone at a location selected independently from (a) near the entry of the oven zone, (b) near the egress of the oven zone, (c) near the middle of the oven zone, or (d) at the transition from one oven zone to the next.

* * * * *